Aug. 26, 1958 P. SCHAGEN 2,849,635
TELEVISION PICK-UP TUBE
Filed Dec. 2, 1953
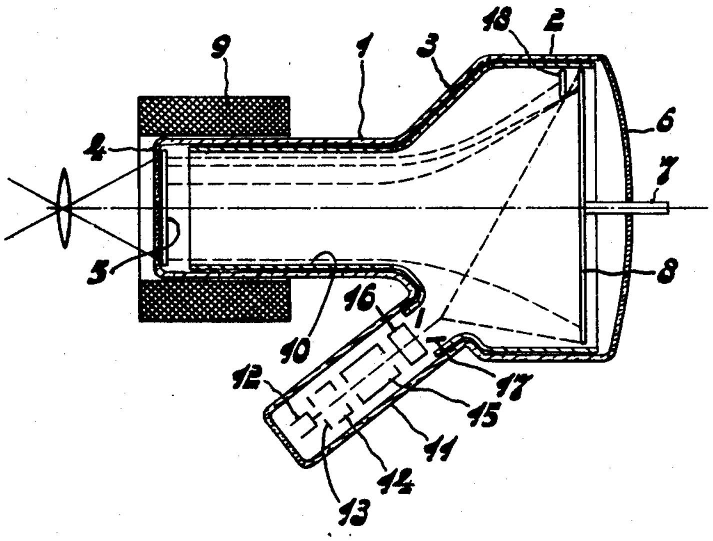
INVENTOR
PIETER SCHAGEN
BY [signature]
AGENT

United States Patent Office 2,849,635

Patented Aug. 26, 1958

2,849,635

TELEVISION PICK-UP TUBE

Pieter Schagen, Eindhoven, Netherlands, assignor, by mesne assignments, to North American Philips Company, Inc., New York, N. Y., a corporation of Delaware Application December 2, 1953, Serial No. 395,679

Claims priority, application Netherlands December 9, 1952

3 Claims. (Cl. 313—65)

This invention relates to television camera or pick-up tubes.

In television image transmitters the pulse train composing the image signal has a pulse of constant strength added to it at regular intervals. This acts to keep constant the mean brilliance or brightness level of the picture produced on the picture screen of the picture tube in the receiver. If this measure is not taken, the mean brilliance will vary with the mean illumination of the scene to be transmitted, which adversely affects the contrast ratio of the picture and causes the viewer to obtain a wrong impression.

According to an often employed measure, this pulse is derived directly from the pick-up tube. The image signal is produced by conversion of light to electric current in a manner such that differences in brilliance are expressed in currents of differing strength and a narrow beam of electrically charged particles scans the surface intended to assist in the conversion in parallel lines. If the beam regularly strikes a part of the surface the illumination of which is always the same, the signal at intervals has a value which is continually repeated. For this purpose a strip along the edge of the target electrode is used which lies at the beginning or the end of the lines and is not struck by light.

In television pick-up tubes employing electron-optical projection of the image received by a photo-electric cathode onto the target electrode, this measure is also used by preventing such a strip from being struck by photo-electrons.

In pick-up tubes of the latter kind the screening can be obtaineed by arranging on the photo-electric cathode an opaque strip which is arranged along the edge of the image area in a manner such that the electron-optical "shadow" of this strip covers the edge of the target electrode. This measure can also be employed if invariably an equally large part of the photo-electric cathode is projected.

The invention relates to television pick-up tubes comprising an electron-optical system of controllable or adjustable strength. Except in the case of minimum enlargement, at any other adjustment the photo-cathode is projected onto the target electrode only in part. Due to the greater dispersion of the electron beams required for the image the shadow border of an opaque strip provided on the photo-cathode with increasing enlargement moves ever farther towards the edge of the target electrode, until finally the target electrode is struck by photo-electrons throughout its surface.

If the electron beam used for scanning the target electrode scans this electrode at the same side as the electrons emitted by the photo-electric cathode, it is possible to obviate this disadvantage by the use of the invention. According to the invention, at the edge of the target electrode situated opposite the electrode system generating the scanning beam, a shielding screen for the photo-electrons is arranged between the target electrode and the photo-cathode so as to be spaced away from the target electrode at no greater distance than is required for the scanning beam to cover the entire surface of the target electrode without being intercepted by the screen and for the screen to prevent a narrow strip along the edge of the target electrode from being reached by the photo-electrons.

The invention will now be described with reference to the accompanying diagrammatic drawing in which an embodiment of a television pick-up tube according to the invention is shown by way of example.

Referring now to the single figure of the drawing, two cylindrical wall portions 1 and 2 having different diameters are interconnected by a conical wall portion 3. The cylindrical portion 1 having the smallest diameter is closed by a flat base 4. The base 4 has, with interposition of a thin transparent conducting layer, a photo-electric cathode 5 applied to its inner side in known manner, which cathode may consist of caesium-antimony, the composition of which is, however, not further described herein.

The wider cylindrical portion is closed by a base 6 which is slightly convex to increase the mechanical strength and bears a central support 7 for a target electrode 8 which is arranged parallel to the photo-electric cathode 5.

An eltcromagnetic system 9 acts to project the photo-electric cathode 5 onto the target electrode 8 by electron-optical means. In addition, an electron-accelerating field is required extending from the photo-cathode 5, and is produced by applying an electric potential difference between the conductive layer under the photo-cathode and a conductive wall 10 surrounding the electron paths and ending at a slight distance from the photo-cathode surface. This wall, which serves as the collector for electrons from the target in a manner well-known to the art, may be constituted as a conductive coating on the tube wall.

The conical wall portion 3 has a cylindrical tube-shaped glass part 11 joined to it which communicates with the space enclosed by the wall portions 1 and 2 and is closed at the end more remote therefrom. It contains the electrode system for generating the scanning beam the axis of which is directed to the centre of the target electrode. The electrode system comprises a cathode 12, a control electrode 13, a first anode 14 and a final anode 15, provision being also made for deflecting means enabling the electron beam to scan the entire surface of the target electrode. Instead of employing electro-static deflecting members 16 and 17 use may be also made of magnetic means.

A shielding screen 18, through which electrons cannot pass, is arranged in the proximity of the target electrode between the target electrode 8 and the photo-cathode 5. It prevents the photo-electrons from striking a small strip along the edge of the target electrode opposite the electrode system producing the scanning beam. Allowance must be made for the fact that the angle at which the electron beams just passing the side of the screen 18 reach the target electrode 8 varies with varying enlargement. This angle is continuously reduced as the enlargement is increased with the result that the electrons producing the edge of the image penetrate further outwards into the space between the screen 18 and the target electrode 8, which, however, in the case of a sufficiently short distance between the screen and the target electrode, is such that in no case does an insufficient screening action obtain even at the strongest possible enlargement. The shortest distance is that at which the scanning beam is just enabled to reach the edge of the target electrode 8 without being intercepted by the screen 18. As will be noted from the drawing, both the screen 18 and target 8 are planar members parallel to one another. Also, it will be observed that the specific embodiment utilized to illustrate the invention is an image-iconoscope type of pick-up tube.

The two broken lines in the upper half of the figure joining the photo-cathode to the target electrode approximately show the outermost courses which in the case of two different enlargements are followed by the photo-electrons reaching the target electrode.

The manner of enlargement control will not be described more fully since for this purpose several systems already known can be used. The diagrammatically shown system 9 will usually consist of a combination of windings which enables the enlargement to be controlled by means of suitable distribution of the required number of ampere-turns among the different coil parts and also acts to make sure that the image rotation is constant throughout the control range.

What is claimed is:

1. A television pick-up tube comprising a target electrode at one end, a photo-electric cathode at the other end producing photo-electrons in response to incident light, adjustable electron-optical means for projecting an electron image produced by part of the cathode onto the target, means disposed on the same side of the target as the cathode for scanning the target with an electron beam, said scanning means being closer to one edge of the target than an opposite edge, means including an electron-opaque member disposed in front of and alongside said opposite edge of said target electrode for intercepting photo-electrons and preventing the latter, independent of the adjustment of the electron-optical means, from impinging on a portion of the target located behind the electron-opaque member but at the same time allowing said scanning means to scan said portion of the target, and a conductive member serving as a collector and surrounding the target electrode.

2. A television pick-up tube of the image-iconoscope type comprising a target electrode at one end, a photo-electric cathode at the other end arranged substantially parallel to the target and producing photo-electrons in response to incident light, adjustable electron-optical means for projecting an electron image produced by a portion of the cathode onto the target, beam-producing means disposed on the same side of the target as the cathode for scanning the target with an electron beam, said scanning means being closer to the bottom edge of the target than the top edge, a narrow, strip-like, electron-opaque, shielding screen disposed in front of, parallel to and alongside said top edge of said target electrode for intercepting photo-electrons, said shielding screen being spaced a small distance from said target whereby the scanning means is able to scan the entire target but photo-electrons from the cathode are always prevented from reaching a narrow strip of the target located behind the screen, and a conductive member serving as a collector and surrounding the target electrode and the shielding screen.

3. A television pick-up tube as set forth in claim 2 wherein both the target and shielding screen are planar.

References Cited in the file of this patent

UNITED STATES PATENTS

| | | |
|---|---|---|
| 2,163,545 | Clothier et al. | June 20, 1939 |
| 2,264,540 | Lubszynski | Dec. 2, 1941 |
| 2,544,753 | Graham | Mar. 13, 1951 |
| 2,738,440 | Theile | Mar. 13, 1956 |